United States Patent
Zhu

(10) Patent No.: US 9,085,716 B2
(45) Date of Patent: Jul. 21, 2015

(54) ALKOXYSILANE CONTAINING POLYURETHANE ADHESIVE COMPOSITIONS CONTAINING CALCIUM CARBONATE

(75) Inventor: Huide Dennis Zhu, Rochester, MI (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 0 days.

(21) Appl. No.: 13/996,270

(22) PCT Filed: Feb. 8, 2012

(86) PCT No.: PCT/US2012/024245
§ 371 (c)(1),
(2), (4) Date: Jun. 20, 2013

(87) PCT Pub. No.: WO2012/112354
PCT Pub. Date: Aug. 23, 2012

(65) Prior Publication Data
US 2013/0269875 A1    Oct. 17, 2013

Related U.S. Application Data

(60) Provisional application No. 61/443,834, filed on Feb. 17, 2011.

(51) Int. Cl.
| | |
|---|---|
| C09J 5/02 | (2006.01) |
| C09J 175/04 | (2006.01) |
| C08K 3/04 | (2006.01) |
| C08K 3/26 | (2006.01) |
| C08G 18/12 | (2006.01) |
| C08G 18/76 | (2006.01) |
| C08G 18/48 | (2006.01) |

(52) U.S. Cl.
CPC . *C09J 5/02* (2013.01); *C08G 18/12* (2013.01); *C08G 18/4812* (2013.01); *C08G 18/7671* (2013.01); *C09J 175/04* (2013.01); *C08K 3/04* (2013.01); *C08K 3/26* (2013.01); *C08K 2003/265* (2013.01)

(58) Field of Classification Search
CPC .................................................. C08G 18/778
See application file for complete search history.

(56) References Cited

U.S. PATENT DOCUMENTS

| | | | |
|---|---|---|---|
| 3,391,101 A | 7/1968 | Kelly et al. | |
| 3,707,521 A | 12/1972 | De Santis | |
| 3,779,794 A | 12/1973 | De Santis | |
| 3,895,043 A | 7/1975 | Wagner et al. | |
| 3,933,725 A | 1/1976 | Dearlove et al. | |
| 4,345,053 A | 8/1982 | Rizk et al. | |
| 4,374,237 A | 2/1983 | Berger et al. | |
| 4,525,511 A | 6/1985 | Kirby et al. | |
| 4,555,561 A | 11/1985 | Sugimori et al. | |
| 4,623,709 A | 11/1986 | Bauriedel | |
| 4,625,012 A | 11/1986 | Rizk et al. | |
| 4,687,533 A | 8/1987 | Rizk et al. | |
| 4,857,623 A | 8/1989 | Emmerling et al. | |
| 4,910,255 A | 3/1990 | Wakabayashi et al. | |
| 4,910,279 A | 3/1990 | Gillis et al. | |
| 5,370,905 A | 12/1994 | Varga et al. | |
| 5,441,808 A | 8/1995 | Anderson et al. | |
| 5,623,044 A | 4/1997 | Chiao | |
| 5,741,383 A | 4/1998 | Kneisel | |
| 5,747,581 A | 5/1998 | Proebster et al. | |
| 5,817,860 A | 10/1998 | Rizk et al. | |
| 5,852,137 A | 12/1998 | Hsieh et al. | |
| 5,880,167 A | 3/1999 | Krebs et al. | |
| 5,922,809 A | 7/1999 | Bhat et al. | |
| 6,015,475 A | 1/2000 | Hsieh et al. | |
| 6,053,971 A | 4/2000 | Lin | |
| 6,096,823 A * | 8/2000 | Shaffer | 524/590 |
| 6,255,433 B1 | 7/2001 | Kuroda et al. | |
| 6,280,561 B1 | 8/2001 | McInnis et al. | |
| 6,319,311 B1 | 11/2001 | Katz et al. | |
| 6,355,127 B1 | 3/2002 | Mahdi et al. | |
| 6,362,300 B1 | 3/2002 | Araki et al. | |
| 6,410,640 B1 | 6/2002 | Fukunaga et al. | |
| 6,512,033 B1 | 1/2003 | Wu | |
| 6,515,164 B1 | 2/2003 | Bolte et al. | |
| 6,809,171 B2 | 10/2004 | Bolte et al. | |
| 7,345,130 B2 | 3/2008 | Zhu et al. | |
| 2003/0009049 A1 | 1/2003 | Smith et al. | |
| 2003/0024639 A1 | 2/2003 | Paulsen et al. | |
| 2003/0144412 A1 | 7/2003 | Miyata et al. | |

(Continued)

FOREIGN PATENT DOCUMENTS

| | | |
|---|---|---|
| CA | 2608744 | 12/2006 |
| CN | 101228246 A | 7/2008 |

(Continued)

OTHER PUBLICATIONS

Machine Translation of JP2008-050389A. Mar. 6, 2008.*
Vrsaljko, D.; Blagojevic, S. L.; Leskovac, M.; Kovacevic, V. Effect of calcium carbonate particle size and surface pretreatment on polyurethane composite Part I: interface and mechanical properties. Materials Research Innovations, 2008, vol. 12, pp. 40-46.*
Lear, Jeff, et al., "The use of experimental design to predict properties of polyurethane sealants," South Charleston Technical Center, Lyondell Chemical Company, South Charleston, WV, USA. Polyurethanes Expo '99. Proceedings of the Polyurethanes Expo '99, Orlando FL, United States, Sep. 12-15, 1999, Publisher: Technomic Publishing Co., Inc., Lancaster, PA., abstract.

(Continued)

*Primary Examiner* — Robert C Boyle
*Assistant Examiner* — Stephen Rieth
(74) *Attorney, Agent, or Firm* — The Dobrusin Law Firm, P.C.

(57) ABSTRACT

A composition comprising; (A.) one or more isocyanate functional prepolymers having alkoxysilane moieties; (B) a catalytic amount of one or mote compounds that catalyze the reaction of isocyanate moieties with moieties containing active hydrogen atoms; (C) carbon black; and (D) untreated calcium carbonate in an amount of about 1 to about 30 parts by weight based on the total weight of the composition.

12 Claims, No Drawings

(56) References Cited

U.S. PATENT DOCUMENTS

| | | | |
|---|---|---|---|
| 2004/0122253 A1 | 6/2004 | Smith et al. | |
| 2004/0143055 A1 | 7/2004 | Nakata et al. | |
| 2004/0204536 A1 | 10/2004 | Miyatani et al. | |
| 2006/0183846 A1 | 8/2006 | Pfenninger et al. | |
| 2006/0270807 A1 | 11/2006 | Zhu et al. | |
| 2008/0041522 A1 | 2/2008 | Zhu et al. | |
| 2008/0255286 A1 | 10/2008 | Pfenninger | |
| 2009/0114336 A1 | 5/2009 | Zhu | |
| 2009/0202837 A1* | 8/2009 | Onuoha et al. | 428/413 |
| 2011/0108183 A1* | 5/2011 | Golombowski | 156/71 |

FOREIGN PATENT DOCUMENTS

| | | | |
|---|---|---|---|
| JP | 11-181400 | | 7/1999 |
| JP | 2002-036414 | | 7/2000 |
| JP | 2000351894 A | * | 12/2000 |
| JP | 2001-279221 | | 10/2001 |
| JP | 2002-030131 | | 1/2002 |
| JP | 2003-212534 | | 7/2003 |
| JP | 2003-238933 | | 8/2003 |
| JP | 2005-501928 | | 1/2005 |
| JP | 2005-281483 | | 10/2005 |
| JP | 2006-028368 | | 2/2006 |
| JP | 2006-249162 | | 9/2006 |
| JP | 2008-050389 | | 3/2008 |
| JP | 2012048717 A | * | 3/2012 |
| WO | 01/53423 | | 7/2001 |

OTHER PUBLICATIONS

Wacker Silicones, Geniosil STP-E-35, pp. 1-2, Trimethoxsllylcamarerarminated polyether, CAS 216597-12-5 (Feb. 13, 2009).

Wacker Silicones, Geniosil STP-E 10, pp. 1-2, Dimethoxy(methyl)silylmethylcarbamate-terminated polyether, CAS 811222-18-5 (Feb. 13, 2009).

Specialty Minerals web site showing it sells calcium carbonate for polyurethane adhesives and all of the recommended grades of calcium carbonate are treated see the print out from www.specialtyminerals.com/specialty-applicataions/specialty-markets-forminerals/adhesives. 2012

Written Opinion and Search Report dated Apr. 12, 2012 for PCT/US2012/024245.

Wacker, Silicones, Geniosil, One Step Ahead Organofunctional Silanes from Wacker, Creating Tomorrow's Solutions, pp. 1-32; dated Dec. 2012.

Fujian Sanmu Chemical Industrial Co., Ltd; *Nano Calcium Carbonate for Adhesives and Sealants* http://www.cccme.org.cn/products/detail-8068780.aspx dated May 5, 2014.

English translation of the Chinese Office action dated May 23, 2014 for application 201280008742.8.

English translation of Notice of Preliminary Amendment for Korean Application No. 2013-7024154 dated Sep. 25, 2014.

* cited by examiner

ALKOXYSILANE CONTAINING POLYURETHANE ADHESIVE COMPOSITIONS CONTAINING CALCIUM CARBONATE

CLAIM OF PRIORITY

This application is a national phase filing under 35 USC §371 from PCT Application serial number PCT/US2012/024245 filed an 8 Feb. 2012, and claims priority therefrom. This application further claims priority from Provisional Application 61/443,834 filed 17 Feb. 2011 both incorporated herein by reference.

FIELD OF INVENTION

This invention relates to polyurethane compositions which are capable of being used to bond glass into structures wherein the compositions comprise isocyanate functional prepolymers containing alkoxy silane moieties and calcium carbonate. The invention further relates to the use of such compositions to bond substrates together, such as windows into structures.

BACKGROUND OF THE INVENTION

Polyurethane sealant compositions typically comprise at least one urethane prepolymer. Adhesives useful for bonding to non-porous substrates, such as glass are described, for example, in U.S. Pat. No. 4,374,237 and U.S. Pat. No. 4,687,533, both incorporated herein by reference. Window installation in a vehicle is typically a three-stage process. First, a clear silane primer is applied to the glass to clean and prepare the surface for bonding. Second, a primer, which is essentially a carbon black dispersion which also contains a compound having silane and/or isocyanate functionality, often referred to as "black-out primer", is then applied over the top of the clear primer. Third, an adhesive is applied to the primed glass which is then installed into tire structure. For vehicles and some buildings, these materials are applied to a frit of a ceramic enamel or an organic coating located about the periphery of the window. The frit is designed to protect the adhesive from exposure to UV light and to hide the adhesive and/or trim components from view, see, U.S. Pat. No. 5,370,905, incorporated herein by reference. Further, when such compositions are used to bond glass substrates to painted substrates, such as for instance, window installation in vehicle manufacturing, the lap shear strength of the bonded substrate may be less than desirable for safety or structural purposes. Consequently, a separate paint primer comprising a solution of one or more silanes and/or isocyanate compounds is often applied to a painted substrate prior to the application of the composition in most vehicle assembly operations for bonding the windshield and the rear window. Alkoxy silane moieties have been reacted into the backbone or onto a portion of the end groups of isocyanate functional prepolymers so as to enhance the adhesion of compositions containing such prepolymers to substrates such as glass and coated surfaces. See Wu U.S. Pat. No. 6,512,033B1; Berger et al. U.S. Pat. No. 4,374,237 and Rizk et al. U.S. Pat. No. 4,687,533 incorporated herein by reference.

In order for an adhesive system to be commercially viable, that system must provide a durable bond. Wu U.S. Pat. No. 6,512,033 discloses the addition of additives which enhance the durability of cured compositions containing such prepolymers. "Durable bond" means that the adhesive holds the window into the structure for a period of years. As the structure to which window glass or plastic coated with an abrasion resistant coating is traditionally bonded lasts for a significant number of years, it is expected that the bond holding the glass or coated plastic into a structure also last a significant number of years. Durable bond preferably means that the adhesive composition once cored maintains its bond to substrates for up to 10 to 20 years when exposed to normal use conditions. Durability is often predicted by accelerated aging tests. In one context durability means that the adhesive exhibits acceptable performance in an accelerated aging test, such as exposing the bonded substrate to water at 90° C. for a period of time, exposure to weatherometer conditions for an extended period over 1000 hours and more preferably over 2000 hours or cataplasma exposure. The additives disclosed in Wu U.S. Pat. No. 6,512,033 can add significant expense to the adhesive compositions.

Adhesive systems utilized in bonding glass into structures often contain fillers. Fillers are added for a variety of reasons including to reduce the cost of the adhesive, to add strength or to color the adhesive. The problem is that if too much filler is added, the inherent properties of the adhesive can be compromised. The conventional wisdom is that adhesive compositions containing isocyanate functional prepolymers containing alkoxy silane moieties may exhibit poor stability. Stability as used in this context means that the adhesive in storage and prior to cure does not undergo unacceptable viscosity growth. If the viscosity of the adhesive composition grows too much the adhesive cannot be applied to a substrate using standard application equipment. It is believed that the presence of fillers, especially calcium carbonate, can negatively impact the stability of adhesive compositions.

It would be desirable to provide a composition which contains fillers which provides a bonded structure with lap shear strengths which meet industry standards, exhibits low viscosity growth during storage and which allows for durable adhesion of the composition to the substrate surfaces, especially where low amounts or no durability stabilizers are utilized.

SUMMARY OF THE INVENTION

In one aspect, the invention is a composition comprising: (A) one or more isocyanate functional prepolymers having alkoxysilane moieties; (B) a catalytic amount of one or more compounds that catalyze the reaction of isocyanate moieties with moieties containing active hydrogen atoms; (C) carbon black; and (D) untreated calcium carbonate in an amount of about 1 to about 30 parts by weight based on the 100 weight parts of the composition. In a preferred embodiment the calcium carbonate is present in an amount of about 2 parts by weight to less than 20 parts by weight of the composition. Preferably the calcium carbonate has an average particle size of about 15 microns or less, more preferably about 10 microns or less and most preferably about 7 microns or less.

The compositions of the invention are useful for bonding two or more substrates together. In a preferred embodiment, the compositions of the invention are useful for bonding glass or coated plastic to a substrate. Preferably, the glass or coated plastic is shaped into a window and the substrate is a window flange of a structure such as a building or an automobile.

In another embodiment, the invention is a method for bonding two or more substrates together which comprises contacting a composition according to the invention with one or more of the substrates and contacting the two or more substrates with the composition of the invention disposed between the substrates and thereafter allowing the composition to care so as to bond the substrate together.

The compositions of the invention are useful in bonding glass, plastic, metal, fiberglass and composite substrates which may or may not be coated or painted. The composition gives lap shear strengths which meet industry standards and provides durable bonds. In a preferred embodiment the composition after care for 7 days at 23° C., plus or minus, 2° C. exhibit a tensile strength of 5 MPa or greater and a quick knife adhesion failure mode after 6 days in 90° C. boiling water of 100 percent cohesive failure. The compositions of the invention exhibit good stability as evidenced by low viscosity growth while in storage. Accelerated stability testing is performed by testing the press flow viscosity after formulation of the adhesive, exposing a sample of the adhesive composition to 65° C. for three days in an airtight container and then performing the press flow viscosity testing again. Preferably the ratio of the press flow viscosity after 3 days at 65° C., in seconds, over the initial press flow viscosity multiplied by 100 is 200 or less. As the composition of the invention exhibits excellent durability the amount of durability stabilizer (such as organophosphite and those disclosed in Wu U.S. Pat. No. 6,512,033) can be reduced or dispensed with. In one embodiment the adhesive compositions of the invention can be formulated in the absence of such durability stabilizers. In one embodiment the adhesive compositions of the invention can be formulated in the absence of other stabilizers such as ultraviolet stabilizers, heat stabilizers or antioxidants.

DETAILED DESCRIPTION OF THE INVENTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

"One or more" as used herein means that at least one, and more than one, of the recited components may be used as disclosed. "Nominal" as used with respect to functionality means the theoretical functionality, generally this can be calculated from the stoichiometry of the ingredients used. Generally, the actual functionality is different due to imperfections in raw material, incomplete conversion of the reactants and formation of by-products. Moieties as used herein mean functional groups containing the recited chemical group, such as isocyanate groups or alkoxy silane groups.

The prepolymers used in the invention includes prepolymers containing isocyanate moieties and alkoxy silane moieties used in polyurethane adhesive compositions. The entire prepolymer used in the adhesive may be prepolymers having alkoxysilane moieties or such prepolymers may be blended with an isocyanate functional prepolymer which does not have alkoxy silane moieties. The isocyanate content of the prepolymers is selected to be sufficient to allow the composition to exhibit adhesion to the desired substrates and not so high that by-products evolved degrade the strength of the cured adhesive. The isocyanate content in the prepolymers is preferably about 0.1 percent by weight or greater, more preferably about 1.0 percent by weight or greater and most preferably about 1.5 percent by weight or greater. The isocyanate content in the prepolymers is preferably about 10 percent by weight or less, more preferably about 5 percent by weight or less and most preferably 3 percent by weight or less. "Isocyanate content" means the weight percentage of isocyanate moieties to the total weight of the prepolymer. The prepolymers contain sufficient alkoxy silane moieties to improve the adhesion to substrates, for instance glass and coated substrates. The alkoxy silane content in the prepolymers is preferably about 0.2 percent by weight or greater, more preferably about 0.4 percent by weight or greater and most preferably about 0.8 percent by weight or greater. The alkoxy silane content in the prepolymers is preferably about 3.0 percent by weight or less, more preferably about 2.0 percent by weight or less and most preferably about 1.5 percent by weight or less. "Alkoxy silane content" means the weight percentage of alkoxy silane moieties to the total weight of the prepolymer.

Preferable isocyanate functional prepolymers for use in the composition of the invention include prepolymers having average isocyanate functionality of about 2.0 or greater and molecular weights (weight average) of about 2,000 or greater. Preferably, the average isocyanate functionality of the prepolymer is about 2.2 or greater, and is more preferably about 2.4 or greater. Preferably, the isocyanate functionality is about 4.0 or less, more preferably about 3.5 or less and most preferably about 3.0 or less. Preferably, the weight average molecular weight of the prepolymer is 2,500 or greater and is more preferably about 3,000 or greater; and is preferably about 40,000 or less, even more preferably about 20,000 or less, more about 15,000 or less and is most preferably about 10,000 or less. The prepolymer may be prepared by any suitable method, such as by reacting an isocyanate-reactive compound containing at least two isocyanate-reactive, active hydrogen containing groups with an excess over stoichiometry of a polyisocyanate under reaction conditions sufficient to form the corresponding prepolymer.

Preferable polyisocyanates for use in preparing the prepolymer include any aliphatic, cycloaliphatic, araliphatic, heterocyclic or aromatic polyisocyanate, or mixtures thereof. Preferably, the polyisocyanates used have an average isocyanate functionality of about 2.0 or greater and an equivalent weight of about 80 or greater. Preferably, the isocyanate functionality of the polyisocyanate is about 2.0 or greater, more preferably about 2.2 or greater, and is most preferably about 2.4 or greater; and is preferably about 4.0 or less, more preferably about 3.5 or less, and most preferably about 3.0 or less. Higher functionality may also be used, but may cause excessive cross-linking, and result in an adhesive which is too viscous to handle and apply easily, and can cause the cured adhesive to be too brittle. Preferably, the equivalent weight of the polyisocyanate is about 80 or greater, more preferably about 110 or greater, and is most preferably about 120 or greater; and is preferably about 300 or less, more preferably about 250 or less, and most preferably about 200 or less. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have isocyanate groups bonded directly to aromatic rings. Even now preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl))methane, and trimethyl hexamethylene diisocyanate. The most preferred isocyanate is diphenylmethane diisocyanate.

The term "isocyanate-reactive compound" as used herein includes any organic compound having at least two isocyanate-reactive moieties, such as a compound containing an active hydrogen moiety, or an imino-functional compound. For the purposes of this invention, an active hydrogen containing moiety refers to a moiety containing a hydrogen atom which, because of its position in the molecule, displays significant activity according to the Zerewitnoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate reactive compound is a polyol, and is more preferably a polyether polyol.

Preferable polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers, polymer polyols (dispersions of vinyl polymers in such polyols, commonly referred to as copolymer polyols) and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxidos can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each of the alkylene oxides. In one preferred embodiment, the polyols comprise propylene oxide chains with ethylene oxide chains capping the polyol. In a preferred embodiment, the polyols comprise a mixture of diols and triols. Preferably, the isocyanate-reactive compound has a functionality of about 1.5 or greater, more preferably about 1.8 or greater, and is most preferably about 2.0 or greater; and is preferably about 4.0 or less, more preferably about 3.5 or less, and is most preferably about 3.0 or less. Preferably, the equivalent weight of the isocyanate-reactive compound is about 200 or greater, more preferably about 500 or greater, and is more preferably about 1,000 or greater; and is preferably about 5,000 or less, more preferably about 3,000 or less, and is most preferably about 2,500 or less.

Preferably, the prepolymers useful in the invention demonstrate the viscosity sufficient to allow the use of the prepolymers in adhesive formulations. Preferably, the prepolymers as prepared demonstrate a viscosity of about 6,000 centipoise. (600 N-S/m$^2$) or greater and more preferably about 8,000 centipoise (800 N-S/m$^2$) or greater. Preferably, the polyurethane prepolymers demonstrate a viscosity of about 30,000 centipoise (3,000 N-S/m$^2$) or less and more preferably about 20,000 centipoise (2,000 N-S/m$^2$) or less. Above about 30,000 centipoise (3,000 N-S/m$^2$), the polyurethane compositions become too viscous to pump and therefore cannot be applied using conventional techniques. Below about 6,000 centipoise (600 N-S/m$^2$), the prepolymers do not afford sufficient integrity to allow the compositions utilizing the prepolymers to be utilized in desired applications. "Viscosity" as used herein is measured by the Brookfield Viscometer, Model DV-E with a RV spindle #5 at a speed of 5 revolutions per second and at a temperature of 25° C.

The amount of isocyanate containing compound used to prepare the prepolymer is that amount that gives the desired properties, that is, the appropriate free isocyanate content and viscosities as discussed hereinbefore. Preferably, the isocyanates are used to prepare in the prepolymer in an amount of about 6.5 parts by weight or greater based on the weight of the prepolymer, more preferably about 7.0 parts by weight or greater and most preferably about 7.5 parts by weight or greater. Preferably, the polyisocyanates used to prepare the prepolymer are used in an amount of about 12 parts by weight or less based on the weight of the prepolymer, more preferably 10.5 about parts by weight or less and most preferably about 10 parts by weight or less.

The polyols are present in an amount sufficient to react with most of the isocyanate groups of the isocyanates leaving enough isocyanate groups to give the desired free isocyanate content of the prepolymer and to provide sufficient flexibility (elastomeric nature) to the cured adhesive. Preferably, the polyols are present in an amount of about 30 parts by weight or greater based on the weight of the prepolymer, more preferably about 35 parts by weight or greater and most preferably about 40 parts by weight or greater. Preferably, the polyols are present in an amount of about 75 parts by weight or less based on the weight of the prepolymer, more preferably about 65 parts by weight or less and most preferably about 60 parts by weight or less.

The prepolymer may be prepared by any suitable method, such as bulk polymerization and solution polymerization. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C. until the residual isocyanate content determined by titration of a sample is very close to the desired theoretical value. The reactions to prepare the prepolymer may be carried out in the presence of urethane catalysts. Examples of such catalysts include the stannous salts of carboxylic acids; such as stannous octoate, stannous oleate, stannous acetate, and stannous laurate; dialkyltin dicarboxylates; such as dibutytin dilaurate and dibutyltin diacetate; tertiary amines; and tin mercaptides. A preferred catalyst is stannous octoate. The amount of catalyst employed is generally between about 0.005 and about 5 parts by weight of the mixture catalyzed.

The isocyanate functional prepolymers are present in the adhesive composition in a sufficient amount such that the adhesive is capable of bonding substrates together. Preferably, the polyurethane prepolymer which contain alkoxy silane moieties is present in an amount of about 30 parts by weight or greater based on the weight of the composition, more preferably about 35 parts by weight or greater, even more preferably about 40 parts by weight or greater and most preferably about 50 parts by weight or greater. Preferably, the polyurethane prepolymer containing alkoxy silane moieties is present in an amount of about 75 parts by weight or less based on the weight of the composition, more preferably about 65 parts by weight or less and most preferably about 60 parts by weight or less. Preferably, the isocyanate functional prepolymer which does not contain alkoxy silane moieties is present in an amount of about 0 parts by weight or greater based on the weight of the composition, more preferably about 2 parts by weight or greater and most preferably about 4 parts by weight or greater. Preferably, the isocyanate functional prepolymer which does not contain alkoxy silane moieties is present in an amount of about 20 parts by weight or less based on the weight of the composition, more preferably about 15 parts by weight or less and most preferably about 5 parts by weight or less. Preferably, the polyurethane prepolymer which contain alkoxy silane moieties is present in an amount of about 60 parts by weight or greater based on the weight of the isocyante functional prepolymers present, more preferably about 80 parts by weight or greater, even more preferably about 85 parts by weight or greater and most preferably about 90 parts by weight or greater. In one embodiment substantially all of the prepolymer in the adhesive compositions contain alkoxy silane moieties. "Substantially all" in this context means that less than 1 percent by weight of the prepolymers do not contain alkoxy silane moieties.

The composition of the invention also comprises carbon black to give the composition the desired black color, viscosity and sag resistance. One or more carbon blacks may be used in the composition. The carbon black used in this invention may be a standard carbon black, which is not specially treated (surface treated or oxidized) to render it nonconductive. One or more nonconductive carbon blacks may be used in conjunction with the standard carbon black, although such inclusion may add cost to the formulation. The amount of carbon black in the composition is that amount which provides the desired color, viscosity, and sag resistance. The carbon black is preferably used in the amount of about 10 parts by weight or greater based on the 100 parts by weight of the composition, more preferably about 12 parts by weight or greater and most preferably about 15 parts by weight or greater. The carbon black is preferably about 35 parts by weight or less based on 100 parts by weight of the composition, more preferably about 30 parts by weight or less and most preferably about 25 parts by weight or less. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and Printex™ 30 carbon black available from Degussa. Nonconductive carbon blacks are well known in the art and include Raven™ 1040 and RAVEN™ 1060 carbon black available from Colombian.

The composition of the invention further comprises calcium carbonate. Calcium carbonate functions as a filler in the composition. Calcium carbonates useful in this invention are standard calcium carbonates. Such standard calcium carbonates are untreated, that is, they are not modified by treatment with other chemicals, such as organic acids or esters of organic acids. Calcium carbonates are present in a sufficient amount such that the desired adhesive properties of the composition are achieved. Preferably, the calcium carbonates are present in an amount of about 1 part by weight or greater, even more preferably about 2 parts by weight or greater, even more preferably about 3 parts by weight or greater and most preferably about 5 parts by weight or greater. Preferably, the calcium carbonate is present in an amount of about 30 parts by weight or less, more preferably less than 20 parts by weight, even more preferably about 15 parts by weight or less and most preferably about 10 parts by weight or less.

The compositions also contain one or more catalysts which catalyzes the reaction of isocyanate moieties with water or an active hydrogen containing compound. Such compounds are well known in the art. Among preferred catalysts are organometallic compounds, tertiary amines and mixtures thereof. Preferred organometallic catalysts include organotin compounds and metal alkanoates. A mixture of a tertiary amine and an organometallic compound is preferred. Included in preferred organo metallic compounds are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. Preferred organotin compounds include dialkyltin dicarboxylates or dialkyltin dimercaptides. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. Preferably the organo metallic compounds are present in an amount of about 60 parts per million or greater based on the weight of the composition, more preferably 120 parts per million or greater. Preferably the organo metallic compounds are present in an amount of about 1.0 parts or less by weight based on the weight of the composition, more preferably 0.5 parts by weight or less and most preferably 0.1 parts by weight or less.

Preferred tertiary amine catalysts include dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methlmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)-ether). Tertiary amines are preferably employed in an amount, based on the weight of the composition of about 0.01 parts by weight or greater, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 part by weight or less and most preferably about 0.4 parts by weight or less.

The composition of the invention also preferably contains one or more plasticizers to modify rheological properties to a desired consistency. Such materials should be free of water, inert to isocyanate groups and compatible with the prepolymer. Such material may be added to the reaction mixtures for preparing the prepolymer, or to the mixture for preparing the final adhesive composition, but is preferably added to the reaction mixtures for preparing the prepolymer and the adduct, so that such mixtures may be more easily mixed and handled. Exemplary plasticizers are well known in the art and include straight and branched alkylphthalates, such as diisononyl phthalate, dioctyl phthalate and dibutyl phthalate, a partially hydrogenated terpene commercially available as "HB-40", trioctyl phosphate, epoxy plasticizers, toluene-sulfamide, chloroparaffins, adipic acid esters, castor oil xylene, 1-methyl-2-pyrrolidinone and toluene. The amount of plasticizer used is that amount sufficient to give the desired rheological properties and disperse the components in the composition of the invention. Preferably, the plasticizer is present in the compositions of the invention in an amount of about 0 part by weight or greater, more preferably about 5 parts by weight or greater and most preferably about 10 parts by weight or greater. The plasticizer is preferably present in an amount of about 35 parts by weight or less and most preferably about 25 parts by weight or less.

The adhesives used in this invention may further comprise moisture stabilizers, which function to protect the adhesive composition from moisture, thereby inhibiting advancement and preventing premature crosslinking of the isocyanates in the curable formulation. Stabilizers known to the skilled artisan for isocyanate functional adhesive systems may be used herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the composition, preferably about 0.5 parts by weight or greater and more preferably about 0.8 parts by weight or greater. Such stabilizers are used in an amount of about 5.0 parts by weight or less based on the weight of the composition, more preferably about 2.0 parts by weight or less and most preferably about 1.4 parts by weight or less.

The adhesive compositions can also contain durability stabilizers known in the art. Among preferred heat stabilizers are alkyl substituted phenols, phosphites, sebacates and cinnamates. Preferred durability stabilizers include the organophosphites disclosed in Wu U.S. Pat. No. 6,512,033, incorporated herein by reference. The durability stabilizers are utilized in a sufficient amount to prevent degradation of the adhesive for a significant portion of the life of the adhesive. Preferably, the amount of durability stabilizer is about 5 parts by weight or less based on the weight of the adhesive; more preferably about 2 parts by weight or less and most preferably about 1.0 part by weight or less. Preferably, the amount of durability stabilizer is about 0.01 parts by weight or greater based on the weight of the adhesive; and most preferably about 0.3 parts by weight or greater. In one preferred embodiment no (0) parts by weight of a durability stabilizer, such as an organophosphite, are utilized in the composition.

The composition may further comprise an ultraviolet light absorber (UV light stabilizer). Any ultraviolet absorber which enhances the durability of the bond of the adhesive to the substrate my be used. Preferred UV light absorbers include benzophenones and benzotriazoles. More preferred UV light absorbers include those from Ciba Geigy such as TINU-VIN™ P, 2-(2'-hydroxy-5'-methylphenyl)-benzotriazole; TINUVIN™ 326, 2-(5-chloro-2H-benzotriazol-2-yl)-6-(1,1-dimethylethyl)-4-methylphenol; TINUVIN™ 213 poly(oxy-1,2-ethanediyl), (α,(3-(3-(2H-benzotriazol-2-yl)-5-(1,1-dimethylethyl)-4-hydroxyphenyl)-1-oxopropyl-ω-hydroxy; poly(oxy-1,2-ethanediyl), (α,(3-(3-(AH-benzotriazol-2-yl)-5-(1,1-dimethylethyl)-4-hydroxyphenyl)-1-oxopropyl)-ω-(α, (3-(3-(2H-benzotriazol-2-yl)-5-(1,1-dimethylethyl)-4-hydroxyphenyl)-1-oxopropyl); TINUVIN™ 327, 2-(3,5-di-tert-butyl-2-hydroxyphenol)-5-chlorobenzotriazole; TINUVIN™ 571, 2-(2H-benzotriazol-2-yl)-6-dodecyl-4-methylphenol, branched and linear; TINUVIN™ 328, 2-(2H-benzotriazol-2-yl)-4,6-bis(1,1-dimethylpropyl)phenol and from Cytec such as CYASORB™ UV-9,2-hydroxy-4-methoxybenzophenone; CYASORB™ UV-24, 2,2'-dihydroxy-4-methoxybenzophenone; CYASORB™ UV-1164, -[4,6-bis (2,4-dimethylphenyl)-1,3,5-triazin-2-yl]-5-(octyloxy) phenol; CYASORB™ UV-2337, 2-(2'-hydroxy-3'-5'-di-t-amylphenyl)benzotriazole; CYASORB™ UV-2908, 3,5-di-t-butyl-4-hydroxybenzoic acid, hexadecyl ester; CYASORB™ UV-5337, 2-(2'-hydroxy-3',5'-di-t-butylphenyl)-5-chlorobenzotriazole; CYASORB™ UV-531, 2-hydroxy-4-n-octoxybenzophenone; and CYASORB™ UV-3638, 2,2-(1,4-phenylene)bis[4H-3,1-benzoxazin-4-one]. More preferred UV light absorbers include CYASORB™ UV-531, 2-hydroxy-4-n-octoxybenzophenone and TINUVIN™ 571 2-(2H-benzotriazol-2-yl)-6-dodecyl-4-methylphenol, branched and linear. Preferably, the UV light absorber is used in a sufficient amount to enhance the durability of the bond of the adhesive to the substrate. Preferably, the UV light absorber is used in an amount of about 0.1 parts by weight or greater, based on the weight of the composition, more preferably about 0.2 weight parts or greater and most preferably about 0.3 parts by weight or greater. Preferably, the UV light absorber is used in an amount of about 3 parts by weight or less based on the weight Of the composition, more preferably about 2 parts by weight or less and most preferably about 1 parts by weight or less. In a preferred embodiment no (0 percent) UV light stabilizer is present in the composition.

The composition may further include a light stabilizer. Any light stabilizer which facilitates the system maintaining a durable bond to the substrate for a significant portion of the life of the structure to which it is bonded may be used. Preferred light stabilizers are hindered amine light stabilizers. Hindered amine light stabilizers generally include those available from Ciba Geigy such as TINUVIN™ 144, n-butyl-(3,5-di-ter-butyl-4-hydroxybenzyl)bis-(1,2,2,6-pentamethyl-4-piperidinyl) malonate; TINUVIN™ 622, dimethyl succinate polymer with 4-hydroxy-2,2,6,-tetramethyl-1-piperidine ethanol; TINUVIN™ 77, bis(2,2,6,6,-tetramethyl-4-piperidinyl) sebacate; TINUVIN™ 123, bis-(1-octyloxy-2,2, 6,6,tetramethyl-4-piperidinyl) sebacate; TINUVIN™ 765, bis(1,2,2,6,6,-pentamethyl-4-piperidinyl) sebacate; CHIMASSORB™ 944 poly[[6-[1,1,3,3-tetramethyl-butyl) amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) available from Cytec; CYASORB™ UV-500, 1,5-dioxaspiro(5,5)undecane 3,3-dicarboxylic acid, bis(2,2,6,6,-tetramethyl-4-piperidinyl)ester; CYASORB™ UV-3581, 3-dodecyl-1-(2,2,6,6,-tetramethyl-4-piperidyl-pyrrolidin-2,5-dione) and CYASORB™ UV-3346, poly[(6-morpholino-s-triazine-2,4-diyl)[2,2,6,6-tetramethyl-4-piperidyl)imino]-hexamethylene[(2,2,6,6-tetramethyl-4-piperidyl)imino]]. More preferred hindered light amine stabilizers include TINUVIN™ 123 bis-(1-octyloxy-2,2,6,6, tetramethyl-4-piperidinyl) sebacate and TINUVIN™ 765 bis (1,2,2,6,6,-pentamethyl-4-piperidinyl) sebacate. A sufficient amount of light stabilizer to enhance the bond durability to the substrate may be used. Preferably, the light stabilizer is used in an amount of about 0.1 parts by weight or greater based on the weight of the composition, more preferably about 0.2 parts by weight or greater and most preferably about 0.3 parts by weight or greater. Preferably, the amount of light stabilizer present is about 3 weight parts or less based on the weight of the composition, more preferably about 2 weight parts or less and most preferably about 1.5 weight parts or less.

The compositions may further comprise one or more adhesion promoters, such as those disclosed in Mahdi, U.S. Patent Publication 2002/0100350 paragraphs 0055 to 0065 and Hsieh, U.S. Pat. No. 6,015,475 column 5, line 27 to column 6, line 41, incorporated herein by reference. The composition of the invention may further comprise a polyfunctional isocyanate for the purpose of improving adhesion of the composition. "Polyfunctional" as used in the context of the isocyanates refers to isocyanates having a functionality of 3 or greater. The polyisocyanates can be any monomeric, oligomeric or polymeric isocyanates having a nominal functionality of about 2.0 or greater. More preferably, the polyfunctional isocyanates have a nominal functionality of about 3.0 or greater. Preferably, the polyfunctional isocyanates have a nominal functionality of about 5 or less. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanate, the one or more adhesion promoters are present in a sufficient amount to promote the adhesion of the adhesive to the glass or other substrate surface to the desired level, usually determined by testing the lap shear strength and failure mode of the bond to the substrate. Preferably, the amount of adhesion promoter is about 10 parts by weight or less based on the weight of the composition; more preferably about 5 parts by weight or less and most preferably about 4 parts by weight or less. Preferably, the amount of adhesion prompter is about 0.01 parts by weight or greater based on the weight of the composition; more preferably about 0.1 parts by weight or greater and most preferably about 1.0 parts by weight or greater.

The compositions may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydrophilic materials are pyrrolidines such as 1 methyl-2-pyrrolidone (or N-methyl pyrrolidone). Another class of hydrophilic materials are high ethylene oxide containing polyether polyols or catalytically active polyols containing amine groups, which can be present independently or incorporated into the isocyanate functional functional prepolymers. The hydrophilic material is preferably present in an amount of about 0.1 parts by weight or greater based on the weight of the composition, and more preferably about 0.3 parts by weight or greater. The hydrophilic material is preferably present in an amount of about 1.0 parts by weight or less and more preferably about 0.6 parts by weight or less. Optionally, the composition may further comprise a thixotrope (rheological additive). Such thixotropes are well known to those skilled in the art and include fumed silica, treated silica and the like. The thixotrope may be added to the composition in a sufficient amount to give the desired rheological properties. Preferably, the thixotrope is present in an amount of about 0 percent by weight or greater based on the weight of the composition and preferably about 1 PERCENT by weight or greater. Preferably, the optional thixotrope is present in an amount of about 10 percent by weight or less based on the weight of the composition and more preferably about 2 percent by weight or less. The compositions may further comprise known additives such as heat stabilizers and antioxidants known to the skilled artisan.

The composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. It may be advantageous to add plasticizers to the reaction mixture for preparing the isocyanate functional prepolymers so that such mixtures may be easily mixed and handled. Alternatively, the plasticizers can be added during blending of all the components. Preferably, the materials are blended under vacuum or an inert gas, such as nitrogen or argon. The ingredients are blended for a sufficient time to prepare a well blended mixture, preferably from about 10 to about 60 minutes. Preferably the ingredients are blended at a temperature of about 25° C. to about 35° C. Once the composition is formulated, it is packaged in a suitable container such that it is protected from atmospheric moisture and oxygen. Contact with atmospheric moisture and oxygen could result in premature crosslinking of the prepolymers containing isocyanate groups.

The composition of the invention is used to bond porous and nonporous substrates together. The composition is applied to a first substrate and the composition on the first substrate is thereafter contacted with a second substrate. Thereafter, the composition is exposed to curing conditions. In a preferred embodiment, one substrate is glass or clear plastic coated with an abrasion resistant coating and the other substrate is a plastic, metal, fiberglass or composite substrate which may optionally be painted or coated. The plastic coated with an abrasion resistant coating can be any plastic which is clear, such as polycarbonate, acrylic, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or coated plastic window has an opaque coating disposed in the region to be contacted with the adhesive to block UV light from reaching the adhesive. This is commonly referred to as a frit. Preferably, the opaque coating is an inorganic enamel or an organic coating.

In a preferred embodiment, the composition of the invention is applied to the surface of the glass or coated plastic, along the portion of the glass or coated plastic which is to be bonded to the structure. The composition is thereafter contacted with the second substrate such that the composition is disposed between the glass or coated plastic and the second substrate. The composition is allowed to cure to form a durable bond between the glass or coated plastic and the substrate. Generally, the compositions of the invention are applied at an ambient temperature in the presence of atmospheric moisture. Exposure to atmospheric moisture is sufficient to result in curing of the composition. Curing may be further accelerated by applying heat to the curing composition by means of convection heating, infrared heating or microwave heating. In another embodiment, the composition may be applied to the surface of the other substrate and then contacted with the glass or coated plastic as described. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure. In one embodiment the composition of the invention is used to replace windows in structures or vehicles and most preferably in vehicles. The first step is removal of the previous window. This can be achieved by cutting the bead of the adhesive holding the old window in place and then removing the old window. Thereafter the new window is cleaned and primed. The old adhesive that is located on the window flange can be removed, although it is not necessary and in most cases it is left in place. The window flange is preferably primed with a paint primer. Thereafter the window with adhesive disposed thereon is contacted with the window flange as described hereinbefore. In another embodiment the adhesive can be applied to the window flange instead of the window.

In another embodiment the compositions of the invention cast be used to bond modular components together. Examples of modular components include vehicle modules, such as door, window or body.

Working time is the time period after application to a substrate wherein the composition is sufficiently tacky to be applied to the surface of a second substrate to bond with the second substrate. Preferably, the composition of the invention is formulated to provide a working time of about 6 minutes or greater and more preferably about 10 minutes or greater. Preferably, the working time is about 20 minutes or less and more preferably about 15 minutes or less. In reference to polyurethane prepolymers, average isocyanate functionality is determined according to Bhat, U.S. Pat. No. 5,922,809 at column 12, line 65 to column 13, line 26, incorporated herein by reference. Molecular weights as described herein are determined according to the following procedure disclosed in Bhat, U.S. Pat. No. 5,922,809 at column 12, lines 50 to 64, incorporated herein by reference. "Parts by weight" refer to compositions which comprise 100 parts total. The adhesion performance of an adhesive is evaluated by a lap shear adhesion test. Preferably, the lap shear strength of the compositions of the invention after cure under 23° C. and 50 percent relative humidity for 7 days is about 400 psi (2.76 MPa) or greater, more preferably 500 psi (3.45 MPs) and most preferably about 600 psi (4.14 MPa). Preferably the percentage of viscosity growth, which is the press flow viscosity after 3 days at 65° C. divided by the initial press flow viscosity time 100, is less than 200. Testing in a Weather-O-Meter (WOM) chamber is often used to accelerate the aging testing of weathering of the sample. SAE J1885 conditions are used here unless specified otherwise. Preferably the sag after 30 minutes is 2 mm or less, more preferably 1 mm or less and most preferably 0 mm.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, if is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only, examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Parts by weight as used herein refers to compositions containing 100 parts by weight. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

SPECIFIC EMBODIMENTS OF INVENTION

The following examples are included for illustrative purposes only and are not intended to limit the scope of the invention. Unless otherwise stated, all parts and percentages are by weight.

Ingredients

Polyoxypropylene diol having a number average molecular weight of 2000.
Polyoxypropylene triol having a number average molecular weight of 4500.
Methylene diphenyl diisocyanate.
Diethyl malonate.
METACURE™ T-9 stannous octoate catalyst.
SILQUEST™ Y-9492 N,N-bis((3-trimethoxysilyl)propyl amine.
FORMREZ™ UL28 dimethyl tin dicarboxylate available from Air Products.
Diisononyl phthalate is a plasticizer.
N-methyl pyrrolidine.
JEFFCAT™ DMDEE catalyst is dimorpholino diethyl ether available from Huntsman Chemical.
ELFTEX™ S7100 standard carbon black available from Cabot.
DRIKALITE™ untreated calcium carbonate having an average particle of about 7 microns available from Imerys Pigments and Additives Group.
HUBERCARB Q325 calcium carbonate having an average particle size of about 13 available from J. M. Huber.
DOVERPHOS™ 4 trisnonylphenol phosphite available from Dover Chemical Corporation.
DESMODUR™ N3300 hexamethylene diisocyanate trimers, available from Bayer.
BETASEAL™ 43518 primer is an organosilane containing clear glass primer available from The Dow Chemical Company.
BETASEAL™ 43520A primer is an isocyanate containing glass primer further containing carbon black available from The Dow Chemical Company.
BETASEAL™ 16100 primer is a silane containing glass primer available from The Dow Chemical Company.

Preparation of Isocyanate Functional Prepolymer Containing Alkoxy Silane Groups Prepolymer 1

761.92 grams of a molecular weight 2000 polypropylene oxide diol, 1104.17 grams of molecular weight 4500 polypropylene oxide triol and 33.52 grams of diisononyl phthalate are charged into a 4-liter kettle equipped with an agitator and a heating jacket under nitrogen protection. The reactants are mixed and heated under nitrogen until the mixture reached 50-52° C. Once the mixture reached 50-52° C., 336.55 grams of methylene diphenyl diisocyanate stored at 45° C. is added and mixed in, for about two minutes. Then, 0.17 g of stannous octoate is added dropwise and slowly. The reaction exothermed and after the reaction temperature peaked, the reaction is held between 70° C. and 85° C. for 20 minutes. Then, the temperature set point on the heating unit is set at 50-52° C. Thereafter, 1083.55 grams of diisononyl phthalate and 32.18 grams of diethyl malonate are added. The mixture is agitated for 45 minutes at 52-54° C. 47.94 grams of N,N-bis((3-trimethoxysilyl)propyl) amine are added dropwise over 10 minutes. The mixture is allowed to react with mixing for two hours at 52-54° C. Thereafter, the resulting prepolymer is packaged in an air tight container. The prepolymer has a viscosity of 14720 centipoise (25° C.) and an isocyanate percentage in the prepolymer is 1.274 percent by weight.

Preparation of Isocyanate Functional Prepolymer

Prepolymer 2

363.68 grams of a molecular weight 2000 polypropylene oxide diol, 527.04 grams of molecular weight 4500 polypropylene oxide triol and 32 grams of diisononyl phthalate are charged into a 4-liter kettle equipped with an agitator and a heating jacket under nitrogen protection. The reactants are mixed and heated under nitrogen until the mixture reached 54° C. Once the mixture reached 54° C., 160.64 grams of methylene diphenyl diisocyanate stored at 45° C. is added and mixed in. Then, 0.08 g of stannous octoate is added dropwise and slowly. The reaction exothermed and after the reaction temperature peaked, the reaction is held between 80° C. and 85° C. for 30 minutes. Then, the temperature set point on heating unit is set at 60° C. Thereafter, 501.20 grams of diisononyl phthalate and 15.36 grams of diethyl malonate are added. The mixture is agitated for 60 minutes. Thereafter, the resulting prepolymer is packaged in an air tight container. The prepolymer has a viscosity of 11160 centipoise (25° C.) and an isocyanate percentage in the prepolymer is 1.49 percent by weight.

Preparation of Adhesive Compositions

The adhesive compositions are prepared by adding the stated amount of Prepolymer 1, Prepolymer 2, diisononyl phthalate and Desmodur N-3300 hexamethylene diisocyanate trimer into a 2 gallon mixer. The mixture is degassed under vacuum and mixed for 10 minutes. The vacuum is broken and n-methyl pyrrolidone, dimorpholinyl-diethyl ether and FORMREZ™ UL28 dimethyl tin dicarboxylate are added. The mixture is degassed with mixing for under vacuum for 5 minutes. Then, the vacuum is broken with nitrogen. Carbon black and CaCO$_3$ are added, previously oven dried and cooled to room temperature. The vacuum is applied slowly. When half of the vacuum is achieved, mixing is started to wet out the fillers for 2 minutes. The vacuum valve is then fully opened and mixing is continued under full vacuum for 15 minutes. Thereafter, mixture is scraped down, DOVERPHOS™ 4 trisnonylphenol phosphate is added, if used, and the full vacuum is applied again before additional mixing. The mixture is mixed under vacuum for another 5 minutes. Then, vacuum is broken with nitrogen and the adhesive composition is packaged into sealed tubes and stored in aluminum bags. Table 1 lists the ingredients of the adhesives prepared and tested in this invention. In Table 1, 1 is DRIKALITE™ untreated calcium carbonate available from and 2 is HUBERCARB Q325 calcium carbonate

TABLE 1

Adhesive Composition

| Ingredient | Adhesive 1 (g) | 1 (wt) | 2 (g) | 2 (wt) | 3 (g) | 3 (wt) |
|---|---|---|---|---|---|---|
| Prepolymer 1 | 837.60 | 52.35 | 837.60 | 52.95 | 837.60 | 52.35 |
| Prepolymer 2 | 72.00 | 4.50 | 72.00 | 4.50 | 72.00 | 4.50 |
| Diisononyl phthalate | 64.00 | 4.00 | 64.00 | 4.00 | 64.00 | 4.00 |
| hexamethylene diisocyanate trimer | 54.40 | 3.40 | 54.40 | 3.40 | 54.40 | 3.40 |
| N-Methyl pyrrolidone | 4.80 | 0.30 | 4.80 | 0.30 | 4.80 | 0.30 |
| dimorpholino diethyl ether | 5.28 | 0.33 | 5.28 | 0.33 | 5.28 | 0.33 |
| dimethyl tin dicarboxylate | 0.32 | 0.02 | 0.32 | 0.02 | 0.32 | 0.02 |
| carbon black | 368.00 | 23.00 | 368.00 | 23.00 | 368.00 | 23.00 |
| calcium carbonate | 184.00[1] | 11.50 | 184.00[1] | 11.50 | 184.00[2] | 11.50 |
| trisnonylphenol phosphite | 9.60 | 0.60 | 0 | 0 | 9.60 | 0.60 |

Test Procedures

Viscosities of prepolymers as described herein are determined according to the procedure disclosed in Bhat, U.S. Pat. No. 5,922,809 at column 12, lines 38 to 49, incorporated herein by reference. Viscosities of adhesives as described herein are determined using press flow. The press flow is the time it takes for 20 grams of adhesive to pass through a 0.157 in. (4.0 mm) orifice at 80 psi (552 kPa) pressure. 3 day-65° C. heat age growth of the adhesive is defined as the press flow viscosity (seconds) after 3 day-65° C. heat treatment on the adhesive divided by the initial press flow viscosity of the adhesive times 100.

The peel adhesion test is performed by placing a triangle bead of 6.3 mm (base)×12 mm (height)×100 mm (length) size on the tested substrate and is pressing it to a height of 3 mm with a release paper. The peel test is run after the initial cure under 23° C. and 50 percent RH (relative humidity) for a specific time period and any further environmental exposure. When tested, a slit (20-40 mm) is cut between the adhesive end and the substrate. The cured bead is then cut with a razor blade through to the tested substrate at a 60 degree angle while pulling back the end of the bead at >90 degree angle. Notches are cut about every 3-5 mm on the substrate. The degree of adhesion is evaluated as adhesive failure (AF), thin film failure (TF) and/or cohesive failure (CF). In case of AF, the cured bead can be separated from the tested substrate surface, while in CF, separation occurs within the sealant adhesive as a result of cutting and pulling and TF is a special case of CF in which there is a thin film of cured adhesive left on the substrate after cutting and testing.

The lap shear test is performed according to SAE J1529 test procedure which is described below. A triangle bead of adhesive composition approximately 6.3 mm base and 8 mm height is applied along the width of the 25 mm by 100 mm a specified coupon, such as a primed glass coupon, and about 6.3 mm away from the coupon end. The second substrate, which can be either primed or not, is immediately pressed on the adhesive bead to give a final height of 6.3 mm for the composition in between. The sample is allowed to cure under conditions of 23° C. and 50 percent relative humidity (RH) for 7 days unless specified otherwise. The sample is then pulled right away or after more environmental exposures at a rate of 2 inch/minute (50 mm/min) with an Instron Tester. The load (lbs) at sample break divided by the sample area (in²) gives the lap shear adhesion strength (psi). The adhesion failure is evaluated as described above. The sag test is carried out using the following procedure below. A metal panel of 10 cm height and 30 cm long is placed vertically on the bench. A right triangle bead of adhesive compositions with 1.8 cm height and 0.62 cm base is dispensed along the top edge of the panel. After 30 minutes, the sag at the tip of the adhesive composition is measured and recorded. Tensile strength, elongation, Young's Modulus, and tear strength are determined according to ASTM D412, Die C. These tests are completed on an Instron test apparatus.

Adhesive 1 is tested after 7 days cure at 23° C., 50 percent relative humidity for several properties as described hereinbefore. The results are: tensile strength 1257±16 psi (8.667 MPa); Elongation 290±5; Tear strength 197±5 N/cm; and Young's Modulus (1-10%) 6.41±0.41. The adhesive is tested for lap shear strength after different cure conditions. The substrates are a metal coupon coated with Gen IV paint and no primer and a glass coupon having a zinc-bismuth frit deposited thereon and BETASEAL 43518 and BETASEAL 43520A applied thereto. The cure conditions and results are compiled in Table 2 The results listed are an average of three samples each.

TABLE 2

Lap Shear of Adhesive 1

| Cure conditions | Lap Shear psi | Lap Shear (MPa) | Failure Mode |
| --- | --- | --- | --- |
| 7 days cure at 23° C., 50% RH | 619 | (4.27) | 100CF |
| 7 days cure at 23° C., 50% RH and 10 days in water at 32° C. | 453 | (3.12) | 100CF |
| 7 days cure at 23° C., 50% RH and 14 days at 100° F., 100% RH | 462 | (3.19) | 100CF |
| 7 days cure at 23° C., 50% RH and 14 days at 90° C. | 520 | (3.59) | 100CF |

Peel adhesion samples of Adhesive 1 are prepared as described above on glass coupons having a Zinc-Bismuth Frit deposited thereon and BETASEAL 43518 and BETASEAL 43520A applied thereto. The coupons after 7 days cure at 23° C., 50% RH are placed in water at 90° C. for 4 and 6 days respectively. All samples tested exhibited 100 percent cohesive failure in the peel adhesion test.

Lap shear coupons as described above are prepared using Adhesives 1 and 2 and the glass coupons described above. The coatings on the metal coupon are varied. The coupons after 7 days cure at 23° C., 50% RH are placed in the weatherometer for 2000 hours and then subjected to lap shear testing. The results listed are an average of five samples. Table 3 lists the coating used and the results.

TABLE 3

Weatherometer Results for Adhesives 1 and 2.

| Coating | Adhesive | Lap Shear psi | Lap Shear (MPa) | Failure Mode |
| --- | --- | --- | --- | --- |
| Gen IV, primerless | 1 | 586 | (4.04) | 100CF |
| GenV, primerless | 1 | 451 | (3.11) | 100CF |
| BASF Z, primerless | 1 | 442 | (3.05) | 100CF |
| GenIV, primerless | 2 | 532 | (3.67) | 100CF |

Adhesives 1 and 3 are tested for press flow viscosity, viscosity growth and sagging for 3 days at 65° C. The results are compiled in Table 4.

TABLE 4

| Test | Adhesive 1 | Adhesive 3 |
| --- | --- | --- |
| Press Flow viscosity initial (sec) | 24, 23 | 25, 24 |
| Press Flow viscosity after 3 days at 65° C. (sec) | 54, 59 | 81, 82 |
| Viscosity Growth (%) | 140 | 232.6 |
| Sag (mm) | 0 | 4 |

Adhesives 4 to 10 are prepared as described above using the ingredients listed in Table 5. The batch size utilized is 1500 grams. The adhesives are tested as described hereinbefore and the results are compiled in Table 6.

TABLE 5

| | Adhesive | | | | | | |
| --- | --- | --- | --- | --- | --- | --- | --- |
| Ingredient | 4% | 5% | 6% | 7% | 8% | 9% | 10% |
| Prepolymer 1 | 60.01 | 59.31 | 57.31 | 54.31 | 50.61 | 41.41 | 60.91 |
| Prepolymer 2 | 4.50 | 4.50 | 4.50 | 4.50 | 4.50 | 4.50 | 4.50 |
| Diisononyl phthalate | 4.00 | 4.00 | 4.00 | 4.00 | 4.00 | 4.00 | 4.00 |
| hexamethylene diisocyanate trimer | 3.40 | 3.40 | 3.40 | 3.40 | 3.40 | 3.40 | 3.40 |
| N-Methyl pyrrolidone | 0.3 | 0.3 | 0.3 | 0.3 | 0.3 | 0.3 | 0.3 |
| dimorpholino diethyl ether | 0.36 | 0.36 | 0.36 | 0.36 | 0.36 | 0.36 | 0.36 |
| dimethyl tin dicarboxylate | 0.03 | 0.03 | 0.03 | 0.03 | 0.03 | 0.03 | 0.03 |
| carbon black | 26.40 | 26.10 | 25.10 | 23.60 | 21.80 | 16.00 | 26.50 |
| calcium carbonate | 1.00 | 2.00 | 5.00 | 9.50 | 15.00 | 30.00 | 0.00 |

Adhesives 4 to 10 are tested using the quick knife adhesion test on fritted glass wherein the samples are prepared as described hereinbefore with two primer systems. The first is BETASEAL™ 43518 clear primer and BETASEAL™ 43520 blackout primer (PS1). The second is BETASEAL™ 16100 one step clear primer system (PS2). The coupons after 7 days cure at 23° C., 50%, RH are placed in water at 90° C. for 4, 6 and 8 days respectively. The results are compiled in Table 6. In Table 6, D means days and PS means primer system

TABLE 6

| PS | D | 4 | 5 | 6 | 7 | 8 | 9 | 10 |
| --- | --- | --- | --- | --- | --- | --- | --- | --- |
| 1 | 4 | 100CF | 100CF | 100CF | 100CF | 100CF | 100CF | 30CF/70AF |
| 1 | 4 | | | 100CF | 100CF | 100CF | | 40CF/60AF |
| 1 | 6 | 100CF | 100CF | 100CF | 100CF | 100CF | 100CF | 15CF/85AF |
| 1 | 6 | | | 100CF | 100CF | 100CF | | 10CF/90AF |
| 1 | 8 | 60CF/40AF | 20CF/80DF | 20CF/80AF | 15CF/85AF | 100CF | 100CF | 5CF/95AF |
| 1 | 8 | | | 20CF/80AF | 20CF/80AF | 65CF/35AF | | 5CF/95AF |
| 2 | 4 | 95CF/5TF | 100CF | 100CF | 100CF | 100CF | 100CF | 5CF/95AF |

TABLE 6-continued

| PS | D | 4 | 5 | 6 | 7 | 8 | 9 | 10 |
|----|---|---|---|---|---|---|---|----|
| 2 | 4 | 65CF/5AF/30TF | 98CF/2AF | 100CF | 100CF | 100CF | 100CF | 100AF |
| 2 | 6 | 30CF/70AF | 50CF/20AF/30TF | 95CF/5AF | 100CF | 100CF | 100CF | 100AF |
| 2 | 6 | 75CF/5AF/20TF | 40CF/40AF/20TF | 95CF/5AF | 100CF | 100CF | 100CF | 100AF |
| 2 | 8 | 5CF/60AF/35TF | 5CF/65TF/30AF | 90CF/10AF | 100CF | 100CF | 100CF | 100AF |
| 2 | 8 | 10TF/90AF | 90TF/10AF | 95CF/5AF | 100CF | 95CF/5AF | 100CF | 100AF |

Adhesives 4 to 10 are tested for various properties as described herein. The tests and results are compiled in Table 7. The press flow viscosity is performed at 25° C.±1° C. For the quick knife adhesion test some of the samples are conditioned for 7 days at 23° C.±1° C. at 50% RH (cond 1). Other samples are conditioned for 7 days at 23° C.±1° C. at 50% RH and then placed under 100° F. (37.8° C.) and 100 percent relative humidity for 14 days. (cond 2). For one set of tests the metal coupons the adhesives are deposited on are naptha wiped, coated with MAC 8000 paint and are primerless (Coat1). For a second, set of tests the metal coupons are naptha wiped, coated with GEN IV paint and are primerless (Coat 2).

TABLE 7

| | Examples | | | | | | |
|---|---|---|---|---|---|---|---|
| Test | 4 | 5 | 6 | 7 | 8 | 9 | 10 |
| Press flow initial (s) | 25 | 26 | 27 | 26 | 23 | 15 | 24 |
| Press Flow 3 day 65° C. (s) | 68 | 72 | 47 | 47 | 43 | 31 | 45 |
| Viscosity Growth | 272 | 277 | 174 | 181 | 186 | 207 | 188 |
| Tensile (psi) | 1222 | 1239 | 1278 | 1229 | 1090 | 745 | 1362 |
| Tensile (Mpa) | (8.43) | (8.54) | (8.81) | (8.47) | (7.52) | (5.13) | (9.3) |
| Elongation % | 302 | 291 | 300 | 297 | 257 | 192 | 320 |
| Tear N/cm | 212 | 199 | 212 | 191 | 184 | 134 | 226 |
| Coat 1, Cond 1 | 100CF | 100CF | 100CF | 100CF | 100CF | 100CF | 100CF |
| Coat 1, Cond 2 | 100CF | 100CF | 100CF | 100CF | 100CF | 100CF | 100CF |
| Coat 2, Cond 1 | 100CF | 100CF | 100CF | 100CF | 100CF | 100CF | 100CF |
| Coat 2, Cond 2 | 100CF | 100CF | 100CF | 100CF | 100CF | 100CF | 100CF |

What is claimed is:

1. A composition comprising:
   (A) one or more isocyanate functional prepolymers having alkoxysilane moieties wherein the isocyanate content of the prepolymers is about 0.1 to about 10 percent by weight of the prepolymers and the alkoxy silane content of the prepolymers is from about 0.2 to about 3.0 percent by weight of the prepolymers and greater than 85 percent by weight of the isocyanate functional prepolymers present contain alkoxysilane moieties;
   (B) a catalytic amount of one or more compounds that catalyze the reaction of isocyanate moieties with moieties containing active hydrogen atoms;
   (C) carbon black in an amount of from about 15 to about 35 percent by weight of carbon black based on the total weight of the composition;
   (D) untreated calcium carbonate in an amount of about 5 to about 15 percent by weight based on the total weight of the composition having an average particle size of about 15 microns or less; and
   (E) one or more polyfunctional isocyanates.

2. The composition according to claim 1 wherein the catalyst is one or more tertiary amine, one or mare organometallic compounds or a mixture thereof.

3. The composition according to claim 1 wherein substantially all of the isocyanate functional prepolymers present contain alkoxysilane moieties.

4. The composition according to claim 1 wherein the calcium carbonate has an average particle size of about 10 microns or less.

5. The composition according to claim 1 wherein the calcium carbonate has an average particle size of about 7 microns or less.

6. The composition according to claim 1 wherein an organophosphite is absent from the composition.

7. The composition according to claim 1 wherein stabilizers are absent from the composition.

8. The composition according to claim 1 wherein the composition after cure for 7 days at 23° C. plus or minus 2° C. exhibits a tensile strength of 5 MPa or greater and a quick knife adhesion failure mode after 6 days in 90° C. boiling water of 100 percent cohesive failure.

9. The composition according to claim 1 wherein: the calcium carbonate is present in an amount of about 5 to about 15 percent by weight; and, carbon black is present in an amount of greater than 20 to about 30 percent by weight.

10. The composition according to claim 1 wherein the one or more polyfunctional isocyanates are present in an amount of about 1 to about 10 percent by weight.

11. The composition according to claim 1 wherein the composition includes a hydrophilic material that draws moisture into the composition.

12. The composition according to claim 1 wherein the hydrophilic material is present in an amount of about 0.1 to about 1.0 percent by weight.

* * * * *